United States Patent [19]

Deininger et al.

[11] 4,132,671
[45] Jan. 2, 1979

[54] PROCESS FOR THE PREPARATION OF CARBON BLACK PELLETS

[75] Inventors: Günter Deininger, Wulfen; Werner Soyez, Bottrop, both of Germany

[73] Assignee: Veba-Chemie Aktiengesellschaft, Postfach, Germany

[21] Appl. No.: 856,113

[22] Filed: Nov. 30, 1977

[30] Foreign Application Priority Data

Nov. 30, 1976 [DE] Fed. Rep. of Germany ....... 2654235

[51] Int. Cl.$^2$ .................. C01B 31/10; B01J 21/18
[52] U.S. Cl. .................. 252/445; 252/421; 264/117; 423/445; 423/460
[58] Field of Search ............ 252/421, 445; 423/445, 423/449, 460, 461; 264/29.1, 117

[56] References Cited

U.S. PATENT DOCUMENTS

| 2,317,026 | 4/1943 | Brown, Jr. et al. | 252/445 |
| 3,917,806 | 11/1975 | Amagi et al. | 252/445 |

FOREIGN PATENT DOCUMENTS

| 72088 | 4/1970 | German Democratic Rep. | 423/460 |
| 617869 | 7/1945 | United Kingdom | 252/445 |
| 962342 | 7/1964 | United Kingdom | 423/461 |

Primary Examiner—P. E. Konopka
Attorney, Agent, or Firm—Oblon, Fisher, Spivak, McClelland & Maier

[57] ABSTRACT

An adsorbent consisting of carbon black pellets, which is formed by aggregation with oil/fats/waxes and other distillation residues of the water containing carbon black separated during the partial gasification/partial combustion of solids and/or liquid combustibles and wherein said aggregation medium is then separated.

3 Claims, No Drawings

PROCESS FOR THE PREPARATION OF CARBON BLACK PELLETS

BACKGROUND OF THE INVENTION

1. Field of the Invention

This invention relates to carbon black adsorbents, and further to a method for the formation of said adsorbents by gasification or partial combustion of liquid and/or solid combustibles, said process resulting in the formation of carbon pellets of separable carbon black.

2. Description of the Prior Art

Carbon black, formed during the gasification or partial combustion of combustibles, is usually washed from the reaction gas stream with water. The resulting suspension of carbon black in the carbon black water is usually characterized by a large specific surface area and other properties typical of activated charcoal.

The recovery of activated charcoal from carbon black has not been previously considered for a number of reasons, among which include:

1. The concentration of the carbon black in the carbon black water represents only about 1 percent by weight. Therefore, recovery of the carbon black by direct methods, such as filtration, is expensive. The separation and drying of the filter cake with a fraction of water of from 80 to 85 percent by weight causes further problems.

2. It is not possible to run a gasification set-up in a way as to guarantee the consistent quality of the carbon black, which is formed as a by-product. As a consequence, it is not possible to use measures which would stabilize the quality of carbon black (such as methods of activation), since, after drying, the carbon black is in the form of a loose powder.

Since the direct recovery of carbon black has until now been economically uninteresting, two methods have been used in order to separate the carbon black from the running water containing it. In these methods, the carbon black is either extracted into oil directly or extracted into oil with a previous petroleum wash. The carbon-oil aggregates or the carbon pellets are then separated and burned. The desirable activated charcoal properties of the carbon black are destroyed, however, through contact of the carbon black with the oil, since the free surface area of the carbon black becomes coated. It is not possible to regenerate the carbon black, such as is known to occur with oil-laden activated charcoal or, at best, it is only possible under limited circumstances. The possibility of obtaining from the aforementioned pellets a useable activated charcoal, therefore, was not heretofore considered.

SUMMARY OF THE INVENTION

Accordingly, one object of the present invention is to provide a technique for direct utilization of the carbon black pellets, above described, in an economically attractive manner.

Another object of the present invention is to enable the use of the said carbon pellets as adsorbents having good activated charcoal properties.

These and other objects of this invention as will hereafter become more clear from the following description have been attained by providing a method for the preparation of an adsorbent, which comprises:

producing a carbon bearing water, by partial combustion or partial gasification of liquids and/or solid combustibles, separating said carbon black therefrom, aggregating said carbon black to form carbon black pellets, in an aggregation medium selected from the group consisting of oils, fats, waxes, distillation residues or mixtures thereof.

and thereafter separating said carbon black pellets from the aggregation medium thereafter.

DETAILED DESCRIPTION OF THE PREFERRED EMBODIMENTS

It has now been unexpectedly found that the carbon black pellets can be simply, directly and economically decomposed into two valuable substances - remaining pellets and oil. The remaining carbon black has important advantages in comparison with the carbon black obtained by the direct route. While the filtered carbon black is prepared with up to 80 to 85 percent by weight of water, the remaining pellets of the present invention have only a water content of about maximum 30 percent by weight. Since these remaining pellets can be easily poured, such operations as transportation, storage and delivery afford no great problems. Because of their high porosity, drying can be attained without any problems. Because of the open pore structure of these remaining pellets, they are especially suited for specialized applications as well as for use in purification measures. Surprisingly, the remaining pellets possess a specific surface area of about 600 $m^2/g$, so that they can be directly used as adsorbents. Besides, these remaining pellets can, as compared to filtered carbon black, still undergo further improvements in quality (such as activation). Experiments have shown, that through appropriate activation measures, said pellets can reach or even overtake the known parameters of commercial activated charcoal (specific surface area, absorption capacity).

Following the aforementioned invention, it is possible, in an ordinary way, to recover a product with specifications which are clearly superior to the carbon black, obtained by direct means. Further it is possible, using the herein proposed technical methods to find a simple and advantageous solution to a variety of problems presented by the, up to now, ordinary methods of recovery of carbon black.

The present invention therefore provides an adsorbent consisting of carbon pellets, which are a result of the partial gasification or partial combustion of oils, oil containing wastes or coal extracts, oil shale or sand, followed by the aggregation using oil, of the carbon black/carbon black water resulting from the aforementioned processes and finally from the separation of the carbon black from said oil.

The present invention further provides a method to prepare an adsorbent, wherein the carbon black which is produced during the partial combustion/gasification of oils/or oil containing wastes, such as is produced from the extracts of coal, shale and sand, in the distilleries or petrochemical industry, is aggregated with oil with formation of carbon pellets, and said carbon pellets are then separated from their oil containing fraction.

The separation of the oil containing fraction of said carbon pellets can be carried out by extraction, distillation, or thermal treatment, or a combination of these particular methods.

As a solvent for the extraction, it is possible to use aliphatic, aromatic, or isocyclic hydrocarbons with at least four C-atoms. It is particularly useful to use low boiling petroleum ether.

After the extraction, the remaining pellets are dried at a temperature of from 300 to 1100° C. so as to recover the solvent. If the thermal treatment is carried out at temperatures higher than 450° C., a cracking of the still adsorbed oil factions occur, whereby there is produced an enlargement of the specific surface area at the same time as an improvement is obtained in the pore structure of the remaining pellets. It is also possible to attain activation of the remaining pellets — eventually even a consolidation or granulation — at temperatures of from 800 to 1100° C. and with addition of CO—$CO_2$ and $H_2O$.

Having generally described the invention, a more complete understanding can be obtained by reference to certain specific examples, which are included for purposes of illustration only and are not intended to be limiting unless otherwise specified.

EXAMPLE 1

The carbon black produced during the gasification of heavy oil is separated from the gas stream with water. Said water is then mixed and shaken with residue from the distillation, wherein the carbon black is aggregated by said oil in the form of pellets and can be separated as such. These pellets can then be extracted with low boiling petroleum ether (bp 80 to 100° C.) in a continuous extract. If one uses three parts by weight of solvent to one part by weight of pellets, then a three-stage extraction is sufficient to decrease the oil current of the pellets to about 4 to 5 percent by weight. The remaining micelles can be separated by distillation into solvent and oil. The solvent is taken back to the extraction, and the oil can be reused for the formation of new pellets or it can be processed further. The remaining pellets which are, after the extraction loaded with solvent, are then heated in an oven. The still remaining solvent fractions are thereby evaporated. After elimination of the solvent, the remaining pellets have, after the aforementioned extraction, a specific surface area of from 250 to 360 $m_2$/g. The ash content of these remaining pellets is — in comparison with the ash content of marketable, technical activated charcoal — very low (about 1.6 percent by weight, with respect to the dried pellets).

If drying in the oven is carried out at temperatures higher than 450° C., then the still remaining oil factions in the remaining pellets undergo cracking. With condensation of the vapors it is possible to recover the remaining solvent as well as the absorbed oil — partially in the form of its cracking product in a quantitative fashion. The pellet masses shrink through the toasting by about 22 to 28 percent by weight and the specific surface area enlarges by larger than 600 $m^2$/g. The absorbent which is obtained after toasting, is free of water and can be stored and transported without further problems. The toasted remaining pellets can be used as a valuable adsorbent directly or can be worked up further by activation to highly valuable activated charcoal. The data herein presented showed, that with a $CO_2$-activation at 900 to 950° C. it was possible to obtain activated charcoal, with a specific surface area of 1,000 to 1,300 $m^2$/g. These values are typical for the specific surface area of highly valuable (technical) activated charcoal. The corresponding methylene blue factors which are a measure of the specific decoloration capacity of activated charcoal, gave typical values between 18 and 24 ml of methylene blue solution (0.15 percent)/100 mgs of activated charcoal; these values thus are clearly higher than the corresponding values of a variety of activated charcoals (technical) (10 to 14).

EXAMPLE 2

Carbon pellets were, after an intermediate storage further extracted of still remaining water droplets with a $C_6$-cut in a Soxhlet extractor. The extraction time was about 1 hour excluding the starting and stopping of the Soxhlet. The at equilibrium still remaining solvent fractions were removed under mild conditions after said extraction. The final balance showed that 98 percent of the extractable oils had been extracted.

After elimination of the remaining solvent fractions, the remaining pellets where dried in a nitrogen stream at 500° C. The loss in weight of the remaining pellets through prolysis of the remaining oil fractions yielded a value of 23 percent. The remaining pellets after toasting, had an ash content of 2.2 percent by weight and a specific surface area of 620 $m^2$/g.

A further fraction of these extracted pellets was activated at 950° C. in a quartz tube with $CO_2$ (20 1/h). The activation time was about 30 minutes. With a loss of about 55 percent by weight, a specific surface area of 1120 $m^2$/g was obtained. The methylene blue test gave for this fraction a value of 21 ml of methylene blue solution (0.15 percent) per 100 mg weight.

What is claimed is:

1. A method for the preparation of carbon black adsorbent pellets of a high specific surface area larger than 600 $m^2$/g from a carbon black-containing water obtained from the partial combustion or partial gasification of liquid oil combustibles or oil-containing solid combustibles which consists of contacting said carbon black-containing water with an aggregation medium selected from the group consisting of oils, fats, waxes, distillation residues and mixtures thereof, in a quantity sufficient to aggregate said carbon black;

forming aggregated carbon black pellets in said aggregation medium;

separating said aggregated carbon black pellets from said water;

extracting said aggregated carbon black pellets with an aliphatic, aromatic or isocyclic hydrocarbon solvent having at least 4 carbon atoms, under conditions sufficient to separate said aggregation medium from said carbon black pellets;

drying said carbon pellets at temperatures from 450 to 1100° C.; and recovering said carbon black adsorbent pellets of high specific surface area.

2. A method for the preparation of carbon black adsorbent pellets of specific surface area of 1000 to 1300 $m^2$/g which comprises further activating the adsorbent pellets obtained by the method of claim 1 at temperatures of from 800° to 1100° C. and with addition of a gas selected from the group consisting of CO, $CO_2$ and $H_2O$.

3. A method according to claim 1 wherein said aggregation medium is heavy oil, said hydrocarbon solvent is low boiling petroleum ether of boiling point 80 to 100° C. and wherein said extraction is a 3-stage extraction with 3 parts by weight of said solvent to 1 part by weight of said aggregated carbon black pellets.

* * * * *